United States Patent [19]

Rowe et al.

[11] Patent Number: 5,513,791
[45] Date of Patent: May 7, 1996

[54] STRIPPABLE MASK PATTERNING OF STOP-OFF FOR DIFFUSION BOND PROCESSING

[75] Inventors: Raymond G. Rowe, Niskayuna; Rebecca L. Casey, Cohoes; Robert J. Zabala, Schenectady; Bruce A. Knudsen, Amsterdam, all of N.Y.

[73] Assignee: General Electric Company, Schenectady, N.Y.

[21] Appl. No.: 218,925

[22] Filed: Mar. 28, 1994

[51] Int. Cl.[6] .................... B23K 1/20; H05K 3/34
[52] U.S. Cl. .................. 228/118; 228/193; 228/205
[58] Field of Search ........................ 228/118, 157, 228/190, 193, 205, 214, 232, 262–71

[56] References Cited

U.S. PATENT DOCUMENTS

| | | | |
|---|---|---|---|
| 3,846,903 | 11/1974 | Rupert et al. | 228/118 |
| 4,220,276 | 9/1980 | Weisert et al. | 228/118 |
| 4,220,506 | 9/1981 | Skurkiss et al. | 430/28 |
| 4,303,570 | 12/1981 | Weisert et al. | 260/31.2 R |
| 4,392,602 | 7/1983 | Darby | 228/157 |
| 5,226,578 | 7/1993 | Douglas | 228/118 |
| 5,316,203 | 5/1994 | Rowe et al. | 228/118 |

FOREIGN PATENT DOCUMENTS 2173511  10/1986  United Kingdom .

*Primary Examiner*—Samuel M. Heinrich
*Attorney, Agent, or Firm*—R. Thomas Payne; James Magee, Jr.

[57] ABSTRACT

An improved method for forming fluid inflatable metal structures is taught. The improvement concerns the patterning of the portion of the structure to be inflated. Patterning is accomplished by first applying a strippable flexible mask coating and then scoring this coating so that a patterned portion may be removed therefrom. The parent portion is the portion of the sheet article to be inflated by subsequent processing. After the patterned portion has been removed, a stop-off is applied to the exposed surface of the first sheet. After the stop-off material has been applied, the remainder of the strippable mask is removed and washed with a detergent to remove the residue from the mask. The sheet having stop-off applied in the pattern to the first sheet is then superposed over a second sheet, and heat and pressure are applied to cause diffusion bonding between the exposed surfaces of the two sheets. Following this bonding, the portion of the sheet carrying the stop-off is inflated to give the article its final configuration.

11 Claims, 1 Drawing Sheet

STRIPPABLE MASK PATTERNING OF STOP-OFF FOR DIFFUSION BOND PROCESSING

BACKGROUND OF THE INVENTION

The present invention relates generally to fabrication of metal parts including sheet form and three-dimensional form by diffusion bonding in patterns followed by super plastic inflation. More particularly, it relates to the diffusion bonding of sheets as well as three dimensional structures in patterns which permit expansion by pneumatic means of the unbonded portions of the sheets and three dimension structures, such as turbine blades used for power generation or for aircraft engines.

The formation of articles from sheets by selective bonding of metal areas of the sheets and the selective prevention of bonding in other areas of the sheets is a well-developed art. Numerous articles, such as refrigerator evaporators, have been made in this fashion from lower-melting metals such as aluminum. In such conventional practice, a resist material or stop-off coating is printed on a sheet surface in a pattern and the sheet is bonded to another sheet in those areas which do not have a stop-off on the surface. By this conventional practice, the bonding occurs where no stop-off is present and does not occur where the stop-off is present.

When this conventional practice is applied to higher melting metals, such as titanium base metals superalloys and the like, additional problems arise because of the higher temperature and higher pressures which are needed to form the surface-to-surface metal bonds and also because of the difficulty of defining the patterns where the bond is to be generated and separating these from the areas where bonding is to be avoided.

In addition, where the high melting alloy starting materials are themselves non-planar and where the starting structures themselves have complex shapes such as double curvatures, such as turbine fan blades used in power generation or jet engines, in the bonding areas. The resist or stop-off which is useful in processing lower melting metal, such as aluminum alloys, is not satisfactory for processing the higher melting alloys, such as titanium base alloys.

Moreover, the conventional practice of silk screening the resist out of the starting sheet stock does not work where the starting stock is itself nonplanar or a complex shape in the bonding portions. This conventional practice is not suitable for achieving the high degree of precision required in masking complex curved surfaces, such as the component halves of a multicurved configuration turbine blade.

There continues to be a need for an improved effective way to economically bond together high melting alloy into articles having complex shapes. Such methods desirably would provide the same strength of interface at the bonding surface as achieved by previous methods; would be less expensive to utilize; would be simpler; and would maintain bonded interfaces equivalent to interfaces which are diffusion bonded after acid cleaning.

SUMMARY OF THE INVENTION

The present invention represents a new method for patterning stop-off which can be automated for precise location of the stop-off and is particularly applicable to patterning surfaces with complex surfaces, such as turbine fan blades used in power generation turbines and jet engines.

In carrying out the present invention in preferred forms thereof, we provide a process for diffusion bonding Ti-6A1-4V component for sheet as well as components having double curvatures in the bonding areas, such as turbine fan blades, used in power generation turbines and aircraft engines.

One illustrated specific method of the invention disclosed herein, comprises the steps of: providing first and second metal parts formed of a base metal, such as titanium; applying a coating of a strippable masking material to one surface of the first part; cutting a pattern in the masking material for defining portions thereof to be removed; removing a portion of the masking material pattern from the metal surface to expose a defined area of uncoated metal on the first part adapted to be diffusion bonded to a complimentary surface on the second part; applying a stop-off coating to the defined area to prevent bonding with the second part; removing the masking material from the uncoated portion of the surface of the first part; permitting bonding to occur in the areas of the first part from which the coating of masking material has been removed and, after cleaning, superposing the patterned surface of the first part over a surface of the second part.

A further aspect of the present invention includes cleaning the residue from the surface of the first part not covered by stop-off, such as by washing with a detergent.

Another aspect of the invention includes applying heat and pressure to induce diffusion bonding between the exposed surface of the first part and the opposed surface of the second part.

According, an object of the present invention is to provide an improved method for diffused bonding of two components to produce high melting alloy to produce complex shapes, such as turbine blades.

Another object of the present invention is to provide a diffused bonded part having interfaces equivalent to interfaces which are diffused bonded after as in cleaning.

A further object of the present invention is to provide a method whereby application of stop-off can both prevent diffusion bonding in the stop-off coated areas and lead to good diffusion bond strength equivalent to clean surfaces in the area not coated by the stop-off.

Other objects and advantages of the invention will be apparent from the following description, the accompanying drawings and the appended claims.

DETAILED DESCRIPTION OF THE INVENTION

Figure 1:
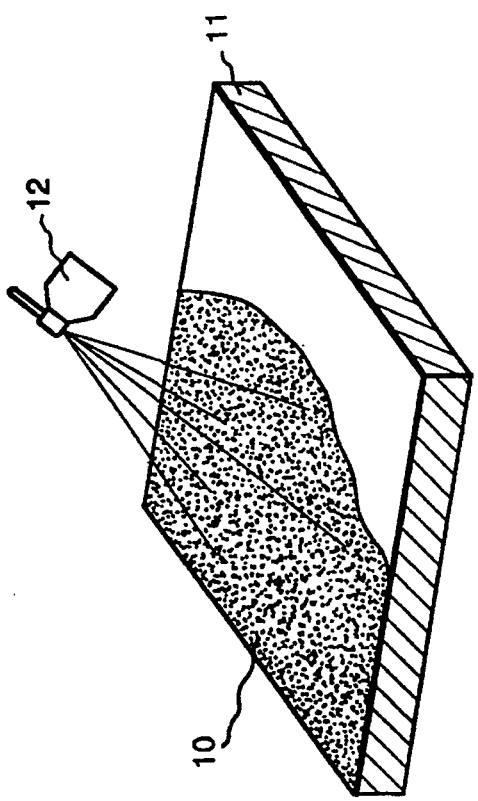
FIG. 1 is a perspective view of a titanium base metal substrate on which a deposit (such as by spraying, dipping or painting) of strippable material is being formed.

In carrying out the subject method, a number of steps are performed in sequence. The sequence is described with reference to the accompanying Figures. As shown in FIG. 1, the sequence starts with the application of a strippable masking material 10 to the surface of a first article, such as sheet 11. It will be appreciated that although the article sprayed as illustrated in FIG. 1, is a planar sheet like object, illustration in this form is for convenience and clarity of illustration. The present invention is, in fact, particularly useful in facilitating solid state bonding of non-planar parts such as parts to be formed along curved surfaces including multicurved surfaces, for example, turbine fan blades used in power generation turbines and aircraft engines.

Application of the masking material 10 may be by any convenient means such as dipping, brushing or spraying, and it is believed preferable to use a spray mechanism 12, where the surfaces of the article to be formed are curved.

Next, a pattern is cut into the layer of the masking material 10 with a laser or with a sharp knife and a guide template. In an actual test, a YAG pulse laser of moderate power was found suitable for this purpose.

Figure 2:
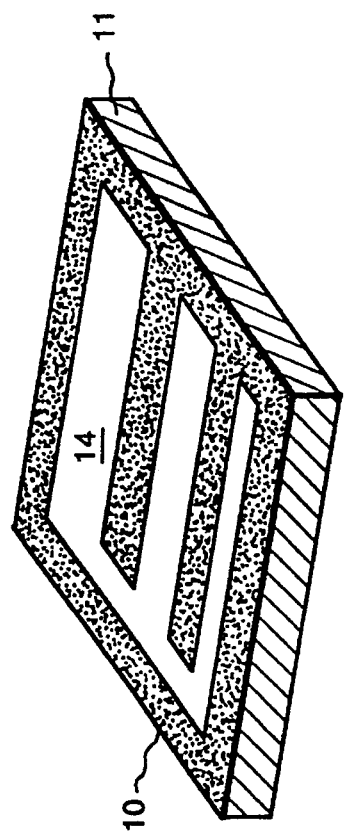
FIG. 2 is the substrate of FIG. 1 on which the completed sprayed layer has been formed and a portion cut and removed.

After the pattern has been cut, a portion 14 of the applied masking material 10 is removed from the surface of the article to expose a patterned area, as illustrated in FIG. 2.

Figure 3:
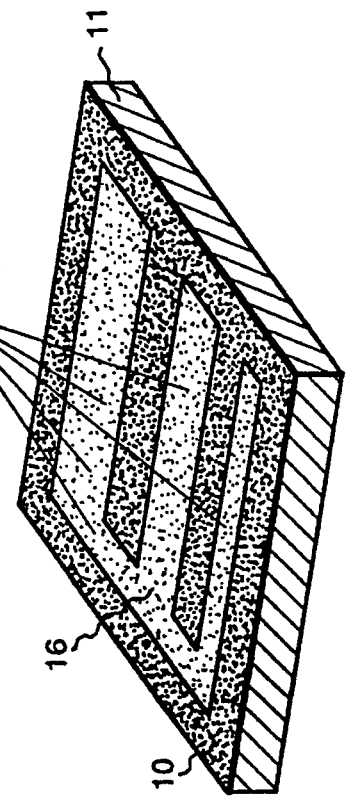
FIG. 3 is a perspective view of the substrate of FIG. 2 on which a spray formed stop-off layer is being formed.

A stop-off coating 16, as illustrated in FIG. 3, for prevention of bonding at that portion of the surface, such as a by air brushing or other conventional techniques, to which the stop-off 16 is applied is then applied to the patterned area. Finally, the remainder of the strippable masking material 10 is then removed.

Figure 4:
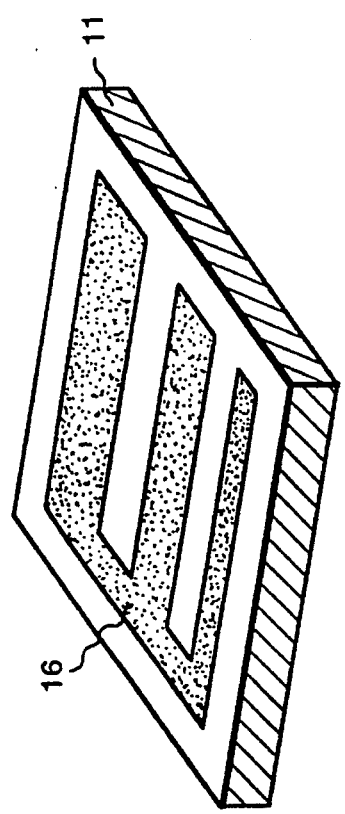
FIG. 4 is the substrate layer of FIG. 3 having the remaining strippable coating which leaves the stop-off displayed in a patterned configuration.

The first article having the patterned area of stop-off 16, as illustrated in FIG. 4, is then disposed on a conforming uncoated part and heat and pressure are applied to cause diffusion bonding of the surface of the article bearing no stop-off material to the confronting portion of the complimentary article to form a bonded composite part. After the bonding of those portions having no stop-off coating thereon of the two confronting articles, high pressure gas is introduced into the unbonded area between the parts to inflate the composite in the unbonded area.

Above, we have described the process in generic terms, now we will provide a specific explanation of the individual steps of this method. Specific individual steps are carried out in sequence as follows. The first step involves providing a metal part, such as one portion of a turbine blade, to be diffusion bonded. The metal part is preferably a titanium base alloy metal and may be, for example, Ti64 (an alloy containing 6 parts by weight of vanadium, 4 parts by weight of aluminum, with the remainder being titanium) or alloy Ti6242 (an alloy containing by weight 6 parts of vanadium, 2 parts of titanium, 4 parts of aluminum, 2 parts of tin, and the balance titanium). Other titanium alloys as well as other metal alloys may be used as well.

This specific process is generally for forming a metal article having a high melting temperature of about 1,000° C. or more. However, it is principally directed toward the formation of titanium base metal articles.

A second metal part having surfaces which conform to the first part must also be provided in order to complete the bonding process. It is possible to produce valuable products from combinations of parts having different thicknesses. The inflation of a pair of diffusion bonded parts having different thicknesses will, of course, produce articles which have some asymmetry in the shape of the inflated composite.

A patterning process is then performed on a selected surface of the first part. This selected surface is first coated with the flexible strippable masking material 10. A suitable material for this masking coating is available commercially under the designation "Sterling Compound A-446". This product is available from the Diversified Products Group of Sterling Engineered Products, at 5201 Grant Avenue, in Cleveland, Ohio 44125. The strippable mask may be any other material that may be commercially available or formulated. Requirements for such material include that the mask coating be easily removed from the metal; that it be tough and strong enough to permit it to be stripped in mostly one-piece from the metal before application of the stop-off coating; that the flexible mask material be tough and strong enough to be strippable from the metal, removing the stop-off coating from areas that are to be diffusion bonded without leaving remnants of the stop-off or the strippable mask material.

The mask 10 is a temporary coating and is essentially completely removed before the diffusion bonding is carried out. However, removal of the mask 10 is a two step process.

The first step in the removal process comprises cutting a predesigned pattern into the strippable masking material 10. Such cutting can be accomplished conveniently with a laser, for example, to give a very sharp edge definition to the masking material and to clearly define the pattern of the masking material to be removed from the surface of the first metal part. It is important to set laser parameters so that the strippable mask is volatilized or cut, but that the titanium base metal is not damaged.

Alternatively, a sharp blade or knife edge focused ultrasound or equivalent methods may be employed to cut through the deposited flexible mask material 10 to define the portion to be removed at this stage of the processing. Where non-planar parts are to be joined the use of laser cutting or other cutting which can be automated for curved and other irregular surfaces is preferred.

The pattern of the mask material defining the non-bonding, as described above, is peeled from the surface of the first sheet of metal to expose the surface of the metal therebeneath. It is not necessary to clean the surface of the exposed metal as it is to be coated with a stop-off material 16 to prevent diffusion bonding.

The next step in the processing is the application of the stop-off 16 to the exposed surface of metal as well as to the surface of the adjoining strippable masking material. Such a stop-off material may be, for example, a metal oxide contained within an organic binder The organic binder facilitates the application of the stop-off 16 to the exposed surface of the first sheet of metal. Such a stop-off should preferably include yttrium oxide and/or other rare earth oxide as the yttrium oxide has been found to be effective in preventing the diffusion bonding.

There is some art involved in the application of the stop-off coating by air brushing. If the coating was applied so that the surface became wet with undried stop-off then the stop-off coating fractured irregularly upon removal of strippable mask. A coating which was applied relatively dry produced the best edge definition. The edge definition of the stop-off pattern was of the order of 0.015 inch for "wet" applied stop-off and less than 0.0075 inch for "dry" applied stop-off. The technique was refined until an edge resolution of 0.0025 inch was repeatable. In the actual experiments, a well-defined "H" pattern with 0.5 inches wide and 2 inches long was produced for diffusion bonding and superplastic forming trials. The center "H" was coated with yttria stop-off coating with ethyl-methacrylate binder. It was observed that after removable of the strippable mask, a light oily residue was present on the surfaces to be diffusion bonded.

In order to produce good diffusion bond ductility and Charpy impact energy, it was necessary for the surfaces to be diffusion bonded to be free of any compounds which could react with the titanium alloy and embrittle the bonded surface or prevent diffusion bonding. The processing of the stop-off coating utilized a 500° F. vacuum bakeout to remove volatile hydrocarbon binder before diffusion bonding. We baked samples containing only oily residue from the strippable mask at the same time and found that most of the oil was removed. Some non-volatized residue was evident, however.

The stop-off material 16 is dried so that its position on the surface of the first sheet is well defined and delineated.

Following the application of the stop-off material 16, the remainder of the original flexible plastic mask material 10 is removed, such as by peeling or other acceptable methods. After the remaining flexible mask 10 is removed, we have determined that it is important to remove the oily residue of the strippable mask material 10 that is left on the part in order to provide clean surfaces which are necessary for good diffusion bonding. We have found that the residue which remains after removal of the Sterling A-446 flexible mask 10 can be removed by an aqueous detergent solution and preferably by an aqueous solution of a detergent such as "Alconox", "Microclean" or "Taski-Profi" or the like may also work but no successful trials have been run with other the "Alconox".

Following the cleaning step with the aqueous detergent solution, the surfaces are rinsed with distilled water and air dried. The patterned stop-off 16 is then vacuum baked at a temperature of between about 350° F. and about 550° F. to remove the majority of the organic binder from the patterned stop-off material. Removal of excess organic binder material from the stop-off prevents contaminants forming on the titanium alloy surfaces.

The organic binder must dry or cure completely so that when the patterned stop-off coating is washed in an aqueous detergent solution, no binder dissolution or removal of the oxide particles occur. It is important that no stop-off material be deposited on the uncoated areas that are to be diffusion bonded.

EXAMPLE

Seven blocks of solution treated and aged (STA) Ti-64A1-4V were cut along the mid-plane of a thick block. The cut surfaces were lapped to provide a good fitting surface when re-assembled. The surfaces were then acid etched clean and given different treatments prior to electron beam welding the periphery of the joint and diffusion bonded at 900° C. for 3 hours at a maximum argon gas pressure of 30 ksi. The treatment of the seven blocks are tabulated in Table 1.

TABLE 1

Interface Treatment of Diffusion Bonded Ti—6Al—4V STA Blocks

| Block Number | Interface Treatment After Lapping | Diffusion Bonding Conditions |
|---|---|---|
| 137 | Acid clean | 900° C./ 3 hr/30 ksi |
| 138 | Acid clean Apply Mask (Sterling Compound A-446*) Strip Mask Vacuum Bakeout 500° F. | 900° C./ 3 hr/30 ksi |
| 163 | Acid clean Apply Mask (Sterling Compound A-446) Strip Mask | 900° C./ 3 hr/30 ksi |

TABLE 1-continued

Interface Treatment of Diffusion Bonded Ti—6Al—4V STA Blocks

| Block Number | Interface Treatment After Lapping | Diffusion Bonding Conditions |
|---|---|---|
| 167 | Detergent wash-Alconox Acid clean Apply Mask (Sterling Compound A-446) Strip Mask | 900° C./ 3 hr/30 ksi |
| 208 | Detergent wash-Alconox 2× longer than block 163 Acid clean Apply Mask (Sterling Compound A-446) Strip Mask | 925° C./ 3 hr/30 ksi |
| 209 | Detergent wash-Microclean-10 minutes Acid clean Apply Mask (Sterling Compound A-446) Strip Mask | 925° C./ 3 hr/30 ksi |
| 210 | Detergent wash-Taski-Profi-10 minutes Acid clean Apply Mask (Sterling Compound A-446) Strip Mask Detergent wash-Alconox-10 minutes | 925° C./ 3 hr/30 ksi |

*Sterling Engineered Products, Diversified Products Group, 5201 Grant Avenue, Cleveland, OH 44125

Full size Charpy samples were EDM cut and ground from the bonded blocks with the notch plane aligned with the bonded interface of the block. Samples were tested at room temperature at a scale of 0–60 ft.lbs. After fracture, the fracture surfaces were examined optically to determine the percentage of the fracture surface which followed the plane of the bond line (the bonded interface). The criterion was that flat fracture surfaces in the plane of the notch were judged to be along the interface. Fracture along bulk microstructural features generally did not follow the interface plane.

The Charpy Impact Energies and interface fracture percentages of the diffusion bonded blocks are shown in Table 2.

TABLE 2

Charpy Impact Energy of Diffusion Bonded Ti—6Al—4V STA Blocks

| Block Number and Treatment | Charpy Impact Energy (ft. lbs.) | Percentage of Fracture along Bonded Interface |
|---|---|---|
| 137 | 20.0 | 0% |
|  | 23.5 | 0% |
| 138 | 9.8 | 100% |
|  | 17.5 | 80% |
|  | 9.3 | 100% |
| 163 | 19.8 | 15% |
|  | 14.8 | 15% |
| 167 | 21.5 | 0% |
|  | 21.5 | 0% |
|  | 23 | 0% |
| 208 | 17.0 | 100% |
|  | 13.0 |  |
|  | 12.5 |  |
| 209 | 18.0 | 55% |
|  | 22.5 |  |
|  | 13.0 |  |
| 210 | 12.0 | 95% |
|  | 11.0 |  |

The first sample, 137, although notched near the diffusion bonded interface, appeared to exhibit Charpy impact values that are associated with properties of the bulk Ti-6A1-4V microstructure. All fracture was through the bulk of the sample and not along the interface. The Charpy impact energies ranged from 20 to 23.5 ft. lb.

Block 138 was diffusion bonded without removing the residue of the Streling Compound A-446 mask, but was baked in vacuum to simulate the processing of SPF/DB samples containing stop-off coatings. The very low Charpy energy and 80–100% interface fracture showed that contamination by strippable mask residue severely reduced the strength and fracture resistance of the interface.

In contrast, blocks that were washed with an aqueous detergent solution after mask application and removal had good Charpy energy and fracture path characteristics. Blocks 163 and 167 were cleaned with detergent after mask removal. Block 163 was washed for approximately half the time of block 167. It had good Charpy energy but exhibited approximately 15% interface fracture. Block 167, washed longer, exhibited no interface fracture and had good Charpy energy. This suggests that washing for the appropriate time appears to remove the damaging residue of the strippable mask. Inadequate washing may have led to partial interface fracture.

Comparison of the Charpy energies of sample 137 (clean interface) with 163 and 167 (masked and washed interfaces), one can see that the Charpy energies are equivalent. The percentage of interface fracture of 167 was the same as for the clean samples, indicating that the bulk properties of the block, not interface properties, determined the Charpy energy.

In summary, diffusion bonded Ti-6A1-4V interfaces formed after strippable mask patterning and detergent washing with Alconox for 5 minutes are equivalent to interfaces which are diffusion bonded after acid cleaning. The process of stop-off patterning by strippable masking with Sterling Compound A-446 and airbrush application of stop-off can both prevent diffusion bonding in the stop-off coated areas and lead to good diffusion bond strengths equivalent to clean surfaces in the areas not coated by stop-off.

In a second series of tests, 208–210, we found that all three detergents cleaned samples were degraded relative to cleanly acid-etched surfaces. The reason for this large difference in the behavior of Alconox in the five-minute test and the ten-minute test is not understood. One possibility is that the diffusion bonding HIP cycle was inadequate. Because of this difference, experiments will have to be repeated to develop better statistics in order to qualify detergent cleaning as a means of removing oily residue, such as that from strippable mask coatings.

Treatment Details

The procedure for all bond blocks was to chemically clean them prior to any treatment. This was done by using a nitric-hydrofloric cleaning etch. Immediately after rinsing with distilled water and drying, the various surface treatments were applied. The detergent cleaning procedure was to place the Ti-6A1-4V in a solution of the detergent and gently swirl for ten minutes, in the case of the ten-minute test. Because we did not want to disturb the remaining stopoff coating, rubbing was not used. Rubbing would improve the speed and effectiveness of cleaning. The cleaning solutions that were used were the concentrations recommended by the manufacturers. They are:

| Detergent | Recommended Dilution |
| --- | --- |
| Microclean | 2-/2 oz. Microclean added to one gallon water |
| Taski-Profi | 50 ml Taski-Profi to 1 L water (1:20) |
| Alconox | 1 pkg (½ oz.) Alconox powder in ½ gal. water |

In summary, it appears that, all other factors being equal, the amount of wash time of the area after removal of the strippable coating may be important. Specifically, it appears that washing the area to be diffusion bonded for approximately 5 minutes produces the best diffusion bonded articles. If the area is washed for about three minutes, the Charpy impact energy is reduced as well as an increase in the percentage of fracture along the bonded interface. However, if the same area is washed for ten minutes utilizing the same detergent used in the three and the five minute tests, the Charpy impact is severely reduced and the diffusion bonded percentages of fractures is one-hundred percent. Therefore, it seems that there is a need to wash for a sufficient time to remove all of the residue but not too long in order to produce other residue or other conditions which have led to the fracture along the bonded interface when washed for ten minutes.

While the methods and articles herein described constitute preferred embodiments of the invention, it is to be understood that the invention is not limited to these precise methods and articles, and that changes can be made therein without departing from the scope of the invention which is defined in the appended claims.

What is claimed is:

1. A method of preparing a metal article for diffusion bonding with a second metal article in a defined pattern comprising the steps of:

providing at least one metal article formed of a high melting temperature alloy;

applying a strippable masking material coating to the surface of the at least one article;

forming a pattern in the masking material coating which defines portions of the masking material coating to be removed;

removing the pattern of masking material coating from the surface of the at least one metal article whereby a section of uncoated metal is exposed on the surface of the at least one article such that the surface of the at least one article is not altered;

applying a stop-off coating over the exposed section of the surface of the at least one metal article;

removing the remaining masking material from the surface of the at least one article, a residue remaining on the surface of the at least one article after the masking material is removed, and washing the surface of the at least one article from which the masking material has been removed from about three (3) to about ten (10) minutes with an aqueous detergent solution to remove the residue of the strippable masking material from the first article.

2. The method of claim 1, further comprising the step of:

vacuum bakeout of the patterned surface having a stop-off therein to remove excess organic material and prevent contamination of the articles.

3. The method of claim 1, wherein the detergent used in the aqueous solution is Alconox.

4. The method of claim 1, wherein the area not covered by stop-off coating is washed with an aqueous solution of Alconox from about 4 to about 6 minutes.

5. The method of claim 1, wherein the area not covered by stop-off coating is washed with an aqueous solution of Alconox from about four (4) to about five (5) minutes.

6. The method of claim 1, further comprising the steps of:

superposing the patterned surface of the first and a surface of the second article, and applying heat and pressure to induce diffusion bonding between the exposed surface of the first article and the opposed surface of the second article.

7. The method of forming a diffusion bond between two titanium base metal sheets in a well-defined pattern comprising the steps of:

providing at least a first and a second metal article formed of titanium base alloy;

applying a flexible masking material coating of a strippable mask material to a surface of at least one metal article;

cutting a pattern in the flexible masking material coating of the at least one metal article to define portions thereof to be removed such that the surface of the at least one metal article is not altered;

removing a portion of the pattern of masking material coating from the metal surface to expose a pattern of uncoated metal;

applying a coating of stop-off material over the exposed uncoated metal;

removing the remainder of the masking material coating from the surface of the at least one metal article, the uncoated metal having an oily residue from the removed flexible masking material coating;

cleaning the oily residue of the flexible masking material coating from the regions of the at least one article not coated by the stop-off coating sufficiently to eliminate partial interface fractures when diffusion bonded;

superposing the patterned surface of one article onto a surface of at least one other article; and applying heat and pressure to induce diffusion bonding between the exposed surface of the opposed surfaces of the at least two (2) articles.

8. The method of claim 7, further comprising the step of:

vacuum bakeout of the patterned surface having a stop-off therein to remove excess organic material and prevent contamination of the articles.

9. The method of claim 7, wherein the oily residue cleansing step further comprises:

washing with an aqueous detergent solution to remove the residue of the strippable masking material from at least the first article.

10. The method of claim 9, wherein the detergent used in the aqueous solution is Alconox.

11. The method of forming a diffusion bond between two titanium base metal sheets in a well-defined pattern comprising the steps of:

providing first and second metal articles formed of titanium base alloy;

applying a masking material coating of a strippable mask material to a surface of at least one article;

cutting a pattern in the masking material coating of the at least one article to define portions thereof to be removed, such that the surface of the at least one article is not altered;

removing a portion of the pattern of masking material coating from the metal surface to expose a pattern of uncoated metal;

applying a coating of stop-off material over the exposed uncoated metal;

removing the remainder of the masking material coating from the surface of the at least one metal article, the surface of the metal article where the masking material coating was removed having an oily residue;

cleaning the oily residue of the flexible coating from the regions of the article not coated by the stop-off coating by washing in an aqueous solution of Alconox for about five (5) minutes but less than about ten (10) minutes;

vacuum bakeout of the patterned surface to remove excess organic material and prevent contamination of the titanium alloy components;

superposing the patterned surface of one article onto a surface of the other article, and applying heat and pressure to induce diffusion bonding between the exposed surface of the opposed surfaces of the two articles.

* * * * *